(12) United States Patent
Saeki et al.

(10) Patent No.: US 8,344,718 B2
(45) Date of Patent: Jan. 1, 2013

(54) DC-DC CONVERTER, METHOD FOR CONTROLLING DC-DC CONVERTER, AND ELECTRONIC DEVICE

(75) Inventors: Mitsuo Saeki, Kawasaki (JP); Koichi Matsuda, Kawasaki (JP); Akira Takeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 10 days.

(21) Appl. No.: 13/177,649

(22) Filed: Jul. 7, 2011

(65) Prior Publication Data

US 2011/0260705 A1   Oct. 27, 2011

Related U.S. Application Data

(63) Continuation of application No. PCT/JP2009/050328, filed on Jan. 13, 2009.

(51) Int. Cl.
*G05F 5/00* (2006.01)
(52) U.S. Cl. ............................................. 323/299
(58) Field of Classification Search ........... 323/299–303
See application file for complete search history.

(56) References Cited

U.S. PATENT DOCUMENTS

| | | | |
|---|---|---|---|
| 5,483,093 A | 1/1996 | Murakami | |
| 5,488,324 A * | 1/1996 | Mizuta et al. | 327/77 |
| 5,572,112 A * | 11/1996 | Saeki et al. | 323/282 |
| 5,668,384 A | 9/1997 | Murakami | |
| 7,741,818 B2 * | 6/2010 | Agari | 323/224 |
| 7,782,041 B1 * | 8/2010 | Li et al. | 323/303 |

FOREIGN PATENT DOCUMENTS

| | | |
|---|---|---|
| JP | 5-3671 | 1/1993 |
| JP | 5-22099 | 1/1993 |
| JP | 5-336732 | 12/1993 |
| JP | 11-55945 | 2/1999 |
| JP | 2000-209857 | 7/2000 |
| JP | 2001-112254 | 4/2001 |
| JP | 2001-224177 | 8/2001 |
| JP | 3370065 | 11/2002 |
| JP | 2006-136146 | 5/2006 |

OTHER PUBLICATIONS

English translation of International Preliminary Report on Patentability, issued Aug. 16, 2011, in PCT/JP2009/050328.
International Search Report for PCT/JP2009/050328, Mailed Apr. 14, 2009.

* cited by examiner

*Primary Examiner* — Jessica Han
(74) *Attorney, Agent, or Firm* — Staas & Halsey LLP

(57) ABSTRACT

A DC-DC converter includes a switching element to generate a pulse waveform by repeatedly admitting and cutting off the input voltage, a fluctuation component restraining circuit to restrain a fluctuation component generated in superposition on the pulse waveform and having a shorter cycle than a cycle of the pulse waveform, and a control circuit to operate the fluctuation component restraining circuit when the input voltage is equal to or larger than a reference voltage.

9 Claims, 15 Drawing Sheets

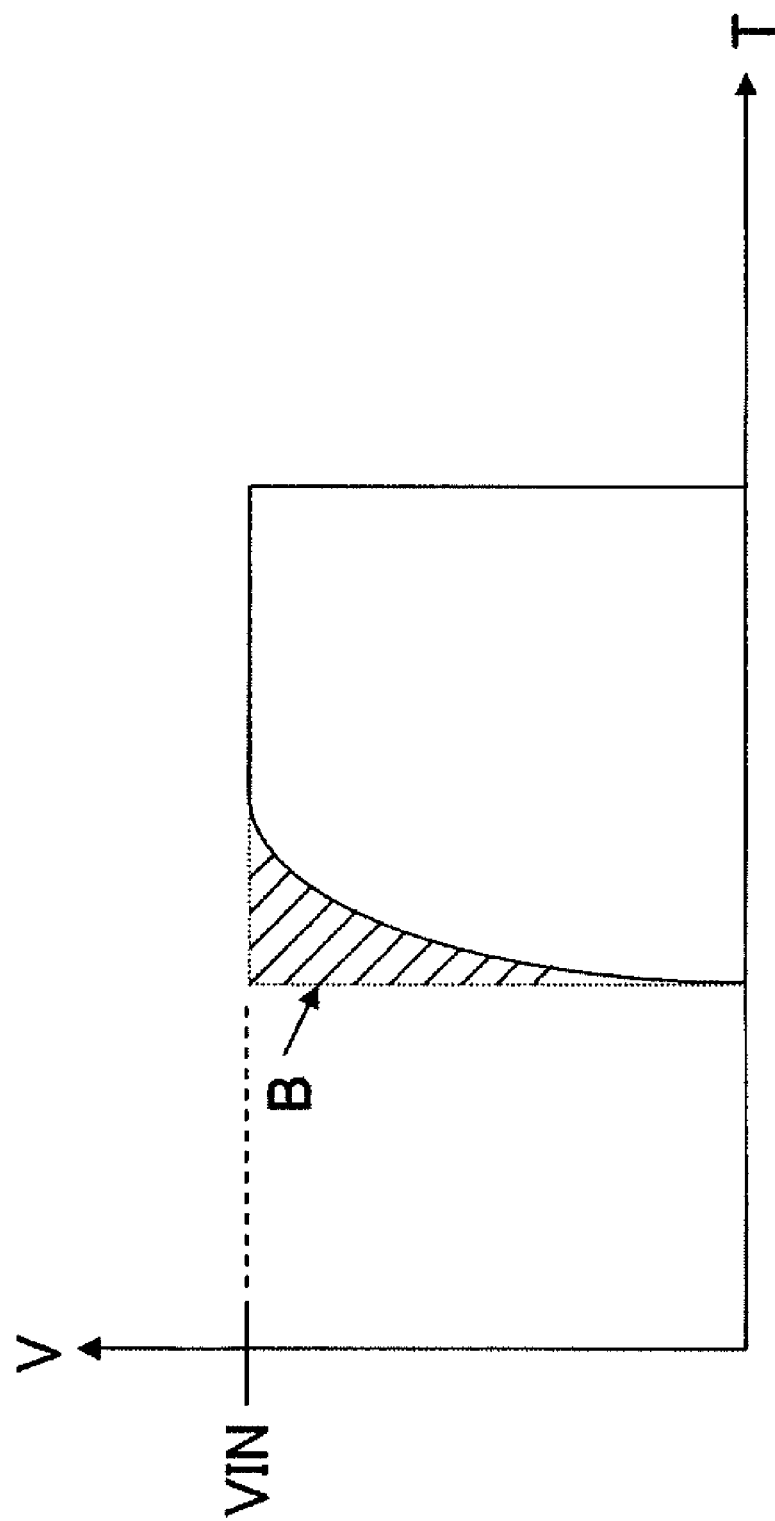

DC-DC CONVERTER, METHOD FOR CONTROLLING DC-DC CONVERTER, AND ELECTRONIC DEVICE

CROSS-REFERENCE TO RELATED APPLICATIONS

This is a continuation of Application PCT/JP2009/050328, filed on Jan. 13, 2009, now pending, the entire contents of which are incorporated herein by reference.

FIELD

The embodiment discussed herein is related to a technology of restraining a fluctuation component of a signal processed by an electronic circuit.

BACKGROUND

In a power generation circuit, there is a DC-DC converter serving as a voltage converting circuit based on a switching system. Herein, the term "switching" connotes switching ON/OFF the switching element such as a FET (Field Effect Transistor) and chopping an input voltage as a square wave. A smoothing circuit smoothes this type of square wave. Then, for example, a desired output voltage value can be obtained by changing a width of the square wave, i.e., a duty ratio.

By the way, when the input voltage is transformed into a pulse wave by this switching element, ringing which accompanies quite a large overshoot occurs depending on an ON-speed (an operation speed, rise time when performing an ON-operation, etc) of the FET. The ringing is defined as a fluctuation component having a shorter cycle than a pulse width of a square wave. The phrase [quite a large] implies "being unignorable" as compared with an amplitude of the pulse waveform.

This ringing becomes a noise source which causes malfunctions in other electronic circuits and a self power circuit inclusive. There are some methods of preventing the ringing.

FIG. 1 illustrates an example of a voltage adjusting circuit having none of countermeasure against the ringing. The voltage adjusting circuit includes a DC-DC controller 1, a pair of FET1, FET2 that receives a control signal from the DC-DC controller 1 and switches an input voltage VIN given from a power source 10, and an inductance element L1 and a capacitor C1 that are supplied with the pulse voltage undergoing the switching by the FET1, FET2 and smooth the pulse voltage in a way that accompanies accumulating and discharging an energy.

The DC-DC controller 1 supplies the pulse voltage alternately to a gate of the FET1 and a gate of the FET2. Then, the DC-DC controller 1 alternately switches ON and OFF the FET1 and the FET2. Both of the inductance element L1 and the capacitor C1 restrain abrupt changes in current and in voltage, and hence a load is supplied with the voltage corresponding to a duty ratio of the pulse waveform based on the switching by the FET1 and the FET2.

FIGS. 2 and 3 illustrate examples of a voltage waveform at a point A in FIG. 1. The point A is defined as a point that is connected to any one of the power source 10 which supplies an input voltage VIN and a ground potential via the FET1 and the FET2. FIG. 3 depicts an example of an ideal voltage waveform at the point A. The original ideal waveform is a waveform approximate to the square wave as in FIG. 3. Normally, a peak value (amplitude) of the square wave is substantially coincident with the input voltage VIN.

On the other hand, FIG. 2 illustrates an example of a result of observing the voltage at the point A in FIG. 1. As in FIG. 2, when observing the waveform at the point A, a fluctuation component having a faster cycle than a switching frequency is detected from a higher voltage than the input voltage VIN as the case may be. This fluctuation component takes a spike-like shape that is shorter in cycle than the square wave in many cases and is called a ringing noise. The ringing noise occurs at the cycle and with the amplitude which depend on characteristics of the respective circuits, corresponding to a switching speed of each of the FET1 and the FET2, a stray capacitance of the terminal and an inductance of the inductance element L1, etc. The ringing noise is superposed on the square wave and forms the voltage waveform containing a higher peak value than the original amplitude value VIN of the square wave.

[Patent document 1]
Japanese Laid-Open Patent Publication No. 2000-209857
[Patent document 2]
Japanese Laid-Open Patent Publication No. 05-3671
[Patent document 3]
Japanese Patent No. 3370065

SUMMARY

According to an aspect of the embodiment, a DC-DC converter to convert an input voltage into a target output voltage includes a switching element to generate a pulse waveform by repeatedly admitting and cutting off the input voltage, a fluctuation component restraining circuit to restrain a fluctuation component generated in superposition on the pulse waveform and having a shorter cycle than a cycle of the pulse waveform, and a control circuit to operate the fluctuation component restraining circuit when the input voltage is equal to or larger than a reference voltage.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 illustrates an example of the observation waveform of the basic control circuit.

DESCRIPTION OF EMBODIMENT

An electronic circuit and an electronic device including the electronic circuit according to an embodiment will hereinafter be described with reference to the drawings. A configuration in the following embodiment is an exemplification, and the electronic circuit and the electronic device are not limited to the configuration in the embodiment.

The present electronic circuit presents, in a circuit including a switching element such as a DC-DC converter, a circuit system for preventing noises that affect the circuit by applying, with respect to removal of ringing noises caused when switching, an improvement commensurate with a state thereof and reducing the ringing. Further, an electronic circuit is proposed, which reduces a degree of how much the switching affects in a manner that decreases a peak of the noises having a possibility of causing a malfunction in another electronic circuit.

<Basic Circuit>

Figure 4A:
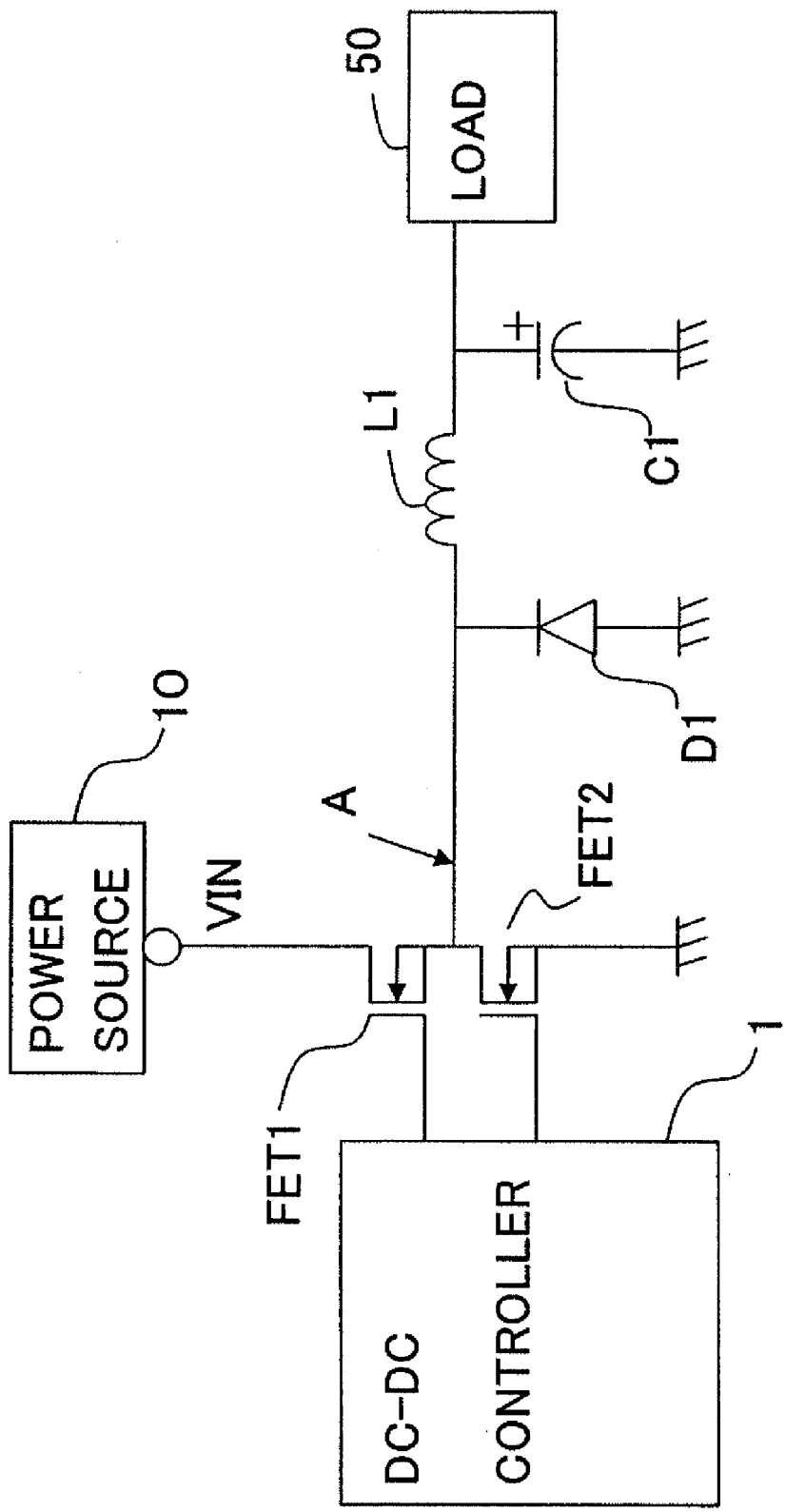
FIG. 4A illustrates a basic control circuit for restraining a ringing noise.
Figure 4B:
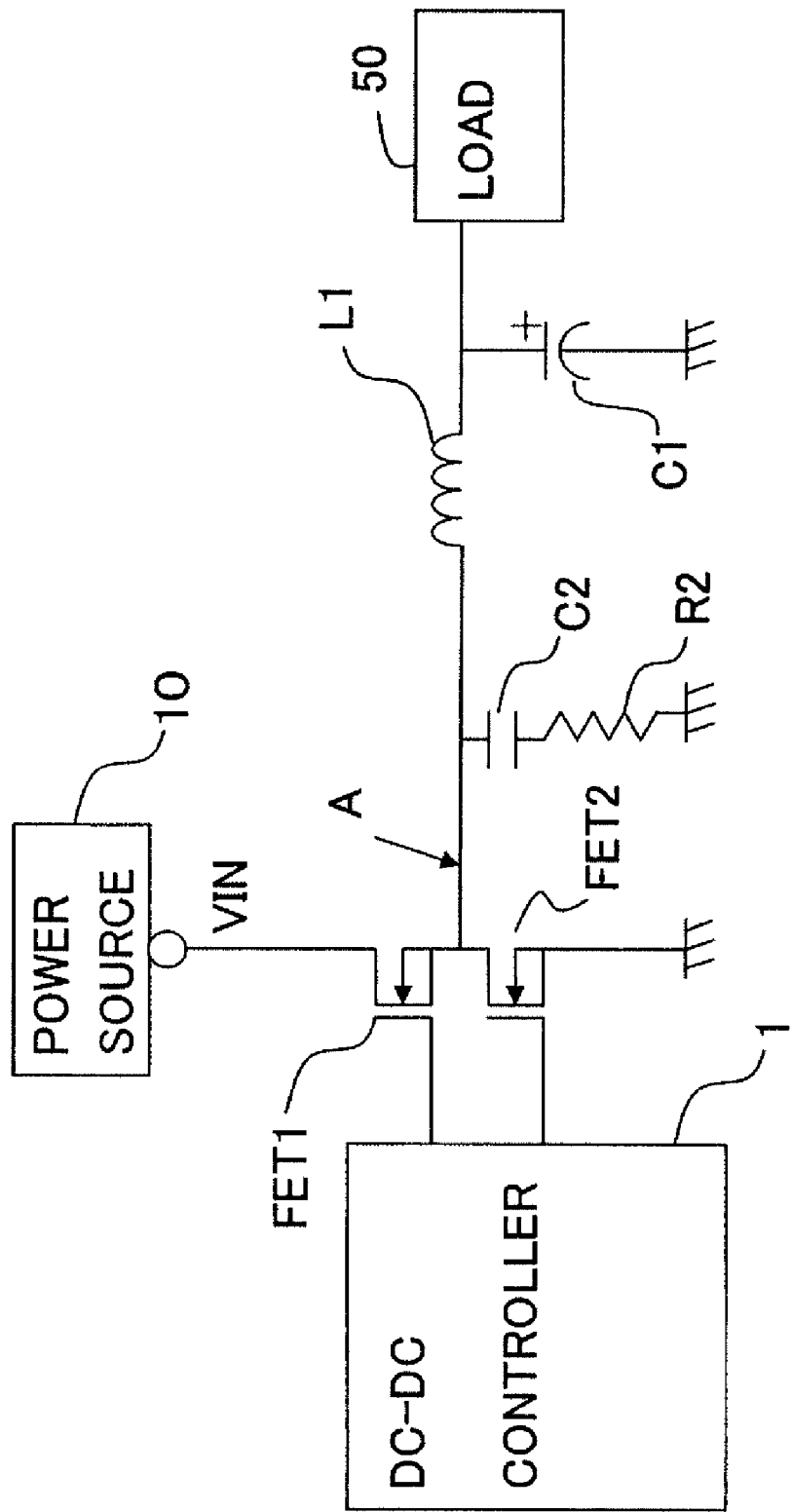
FIG. 4B illustrates the basic control circuit for restraining the ringing noise.
Figure 4C:
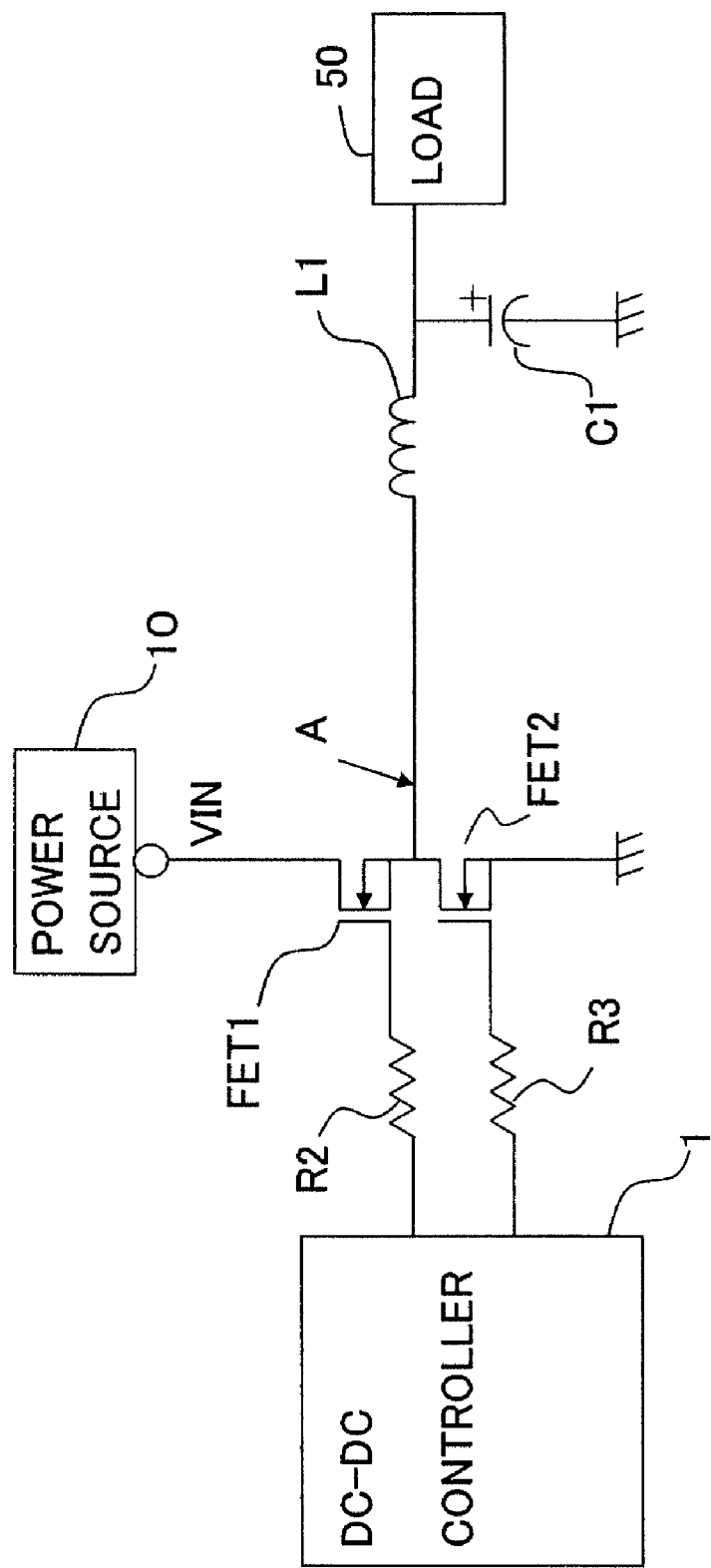
FIG. 4C illustrates the basic control circuit for restraining the ringing noise.

FIGS. 4A-4C illustrate a basic control circuit for restraining the ringing noises. FIG. 4A illustrates the basic control circuit equipped with a diode D1 (which corresponds to a fluctuation component restraining circuit and will hereinafter be also termed a ringing prevention circuit) between a point A and a ground potential. The diode D1 is generally called a flywheel diode as the case may be. The diode D1 is inserted in between a path leading to a load 50 from the point A located on the side of output terminals of FET1, FET2 and the ground potential, in which a cathode is disposed on the side of the path, while an anode is disposed on the side of the ground potential. Accordingly, it follows that the diode D1 is inserted in parallel with the circuit toward the load 50 from an inductance element L1. Therefore, a junction functions as a capacitor, i.e., a lowpass filter in a state where a backward bias is applied to the diode D1. As a result, the ringing noises superposed on pulse waves at the point A are restrained.

FIG. 4B depicts a basic control circuit equipped with a CR circuit (corresponding to the fluctuation component restraining circuit) in which a capacitor C2 and a resistance R2 are arranged in series between the point A and the ground potential. This CR circuit is generally called a snubber circuit as the case may be. The CR circuit is, it follows, inserted in parallel with the circuit extending toward the load 50 from the inductance element L1. Hence, the capacitor C2 absorbs the sharp ringing noises and functions as the lowpass filter. Consequently, the ringing noises superposed on the pulse waves at the point A are restrained.

FIG. 4C illustrates a basic control circuit in which resistances R2, R3 (corresponding to the fluctuation component restraining circuit) are inserted in connection terminals to gates of the FET1, FET2 defined as the switching elements. The series CR circuit is configured by the resistance R2 and a stray capacitance of the gate of the FET1. Similarly, another series CR circuit is configured by the resistance R3 and the stray capacitance of the gate of the FET2. Accordingly, it follows that waveforms of control signals to the gates for controlling the switching operations of the FET1 and FET2 are made obtuse, thereby restraining the ringing.

Figure 3:
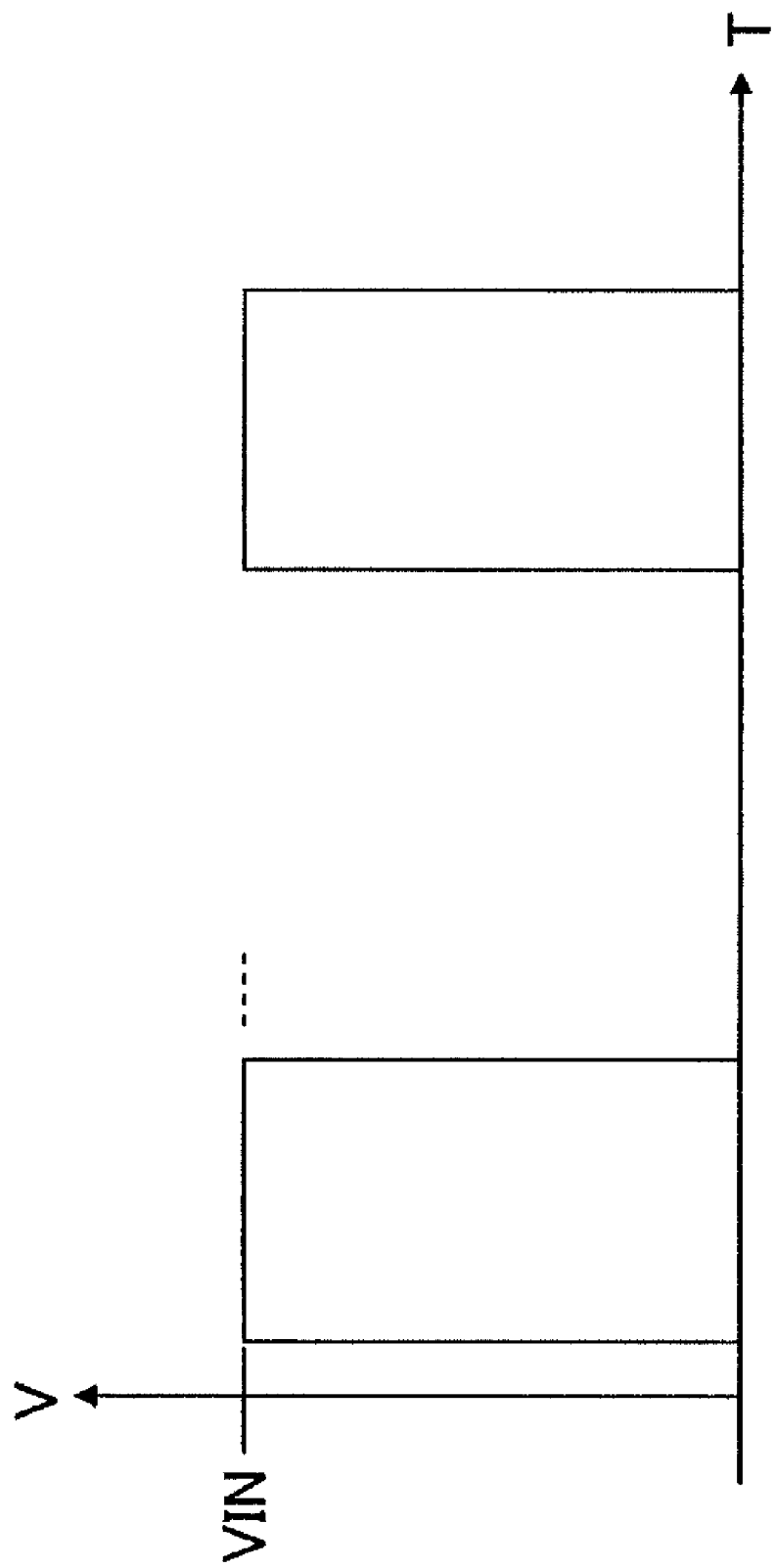
FIG. 3 illustrates an example of an ideal voltage waveform.
Figure 5:
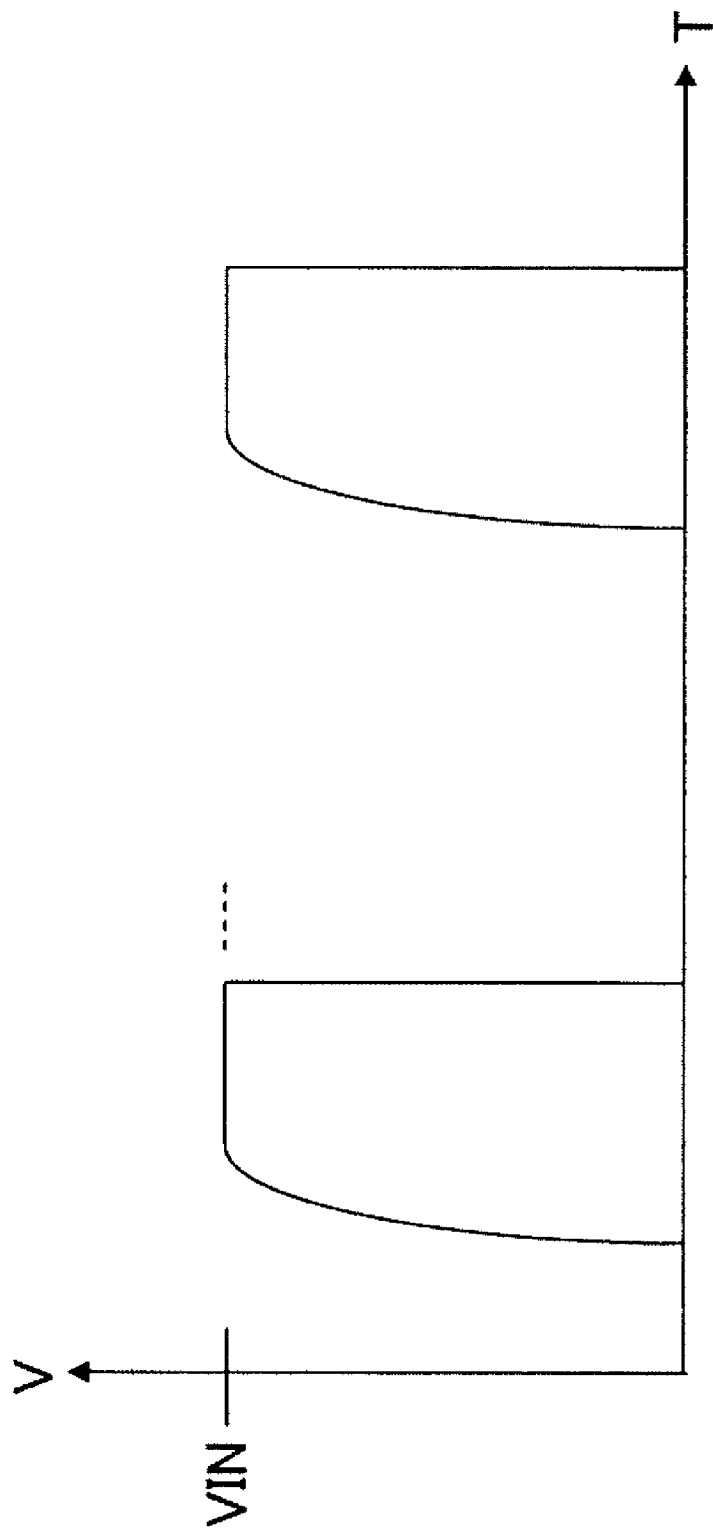
FIG. 5 illustrates an example of an observation waveform of the basic control circuit.

FIGS. 5 and 6 illustrate examples of the observation waveforms observed at the points A of the basic control circuits in FIGS. 4A-4C. As in FIGS. 5 and 6, in each of these circuits, a rise portion of a square wave results in a delay as compared with an ideal waveform (see FIG. 3). Therefore, the obtuseness appears in the waveform of the rise portion. In this case, in the basic control circuit, a portion B (hatching area) in FIG. 6 corresponds to a switching loss, which has a possibility of deteriorating efficiency of the DC-DC converter. While on the other hand, in the case of not restraining the ringing noises, the ringing noises reach a voltage value that is far larger than the input voltage, and hence the FET1, the FET2 and other electronic circuit components need being replaced by high breakdown voltage components, in which a fracture might occur due to being over the breakdown voltage of the element as the case may be.

Such being the case, the present embodiment discusses an example of adding, to the basic control circuit, a function capable of exhibiting effects of both of restraining the ringing noises and restraining the switching loss accompanying the obtuseness of the waveform.

FIRST WORKING EXAMPLE

Figure 7A:
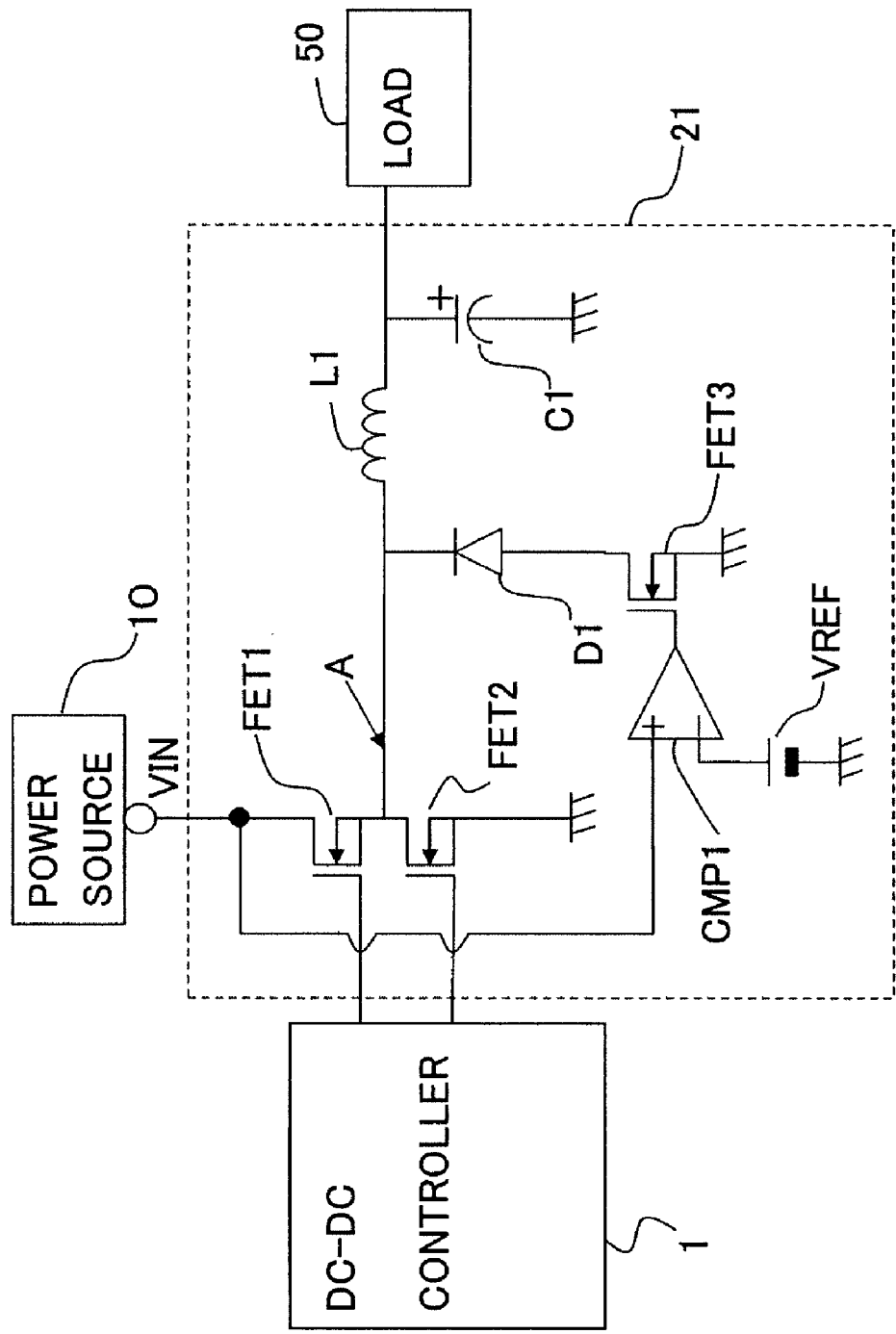
FIG. 7A is a diagram illustrating a voltage adjusting circuit according to a first working example.

FIG. 7A illustrates a voltage adjusting circuit 21 according to a first working example. The voltage adjusting circuit 21 includes, in addition to the configuration of the basic control circuit in FIG. 4A, an FET3 defined as the switching element provided between the diode D1 and the ground potential. The FET3, for example, can be constructed of an N-type MOS (Metal-Oxide-Semiconductor) transistor. An output terminal of a comparator CMP1 is connected to a gate of the FET3.

The comparator CMP1 compares an input voltage VIN given from a power source 10 with a threshold voltage VREF. Then, if the input voltage VIN is higher than the threshold voltage VREF, the comparator CMP1 sets the gate of the FET3 at a high potential (HI). As a result, the FET3 is set in an ON-state, and it follows that the diode D1 is inserted in between the ground potential and the point A in a direction as a forward direction toward the point A from the ground potential. The comparator CMP1 and the FET3 correspond to a control circuit.

Whereas if the input voltage VIN is lower than the threshold voltage VREF, the comparator CMP1 sets the gate of the FET3 at a low voltage (LO). Consequently, the FET3 is set in an OFF-state, and it follows that the diode D1 is cut off from the ground potential. Thus, the circuit including the comparator CMP1 and the FET3 operates the diode D1 in the way of being limited to a case where the input voltage from the power source 10 exceeds the threshold voltage VREF defined as a reference value. Accordingly, the diode D1 is made to function in the manner of being limited to the case in which the ringing noise is superposed on the pulse waveform when switching and a peak value of the signal waveform has a possibility of exceeding a predetermined limit such as a breakdown voltage, a rating, etc of the circuit element, thus restraining the ringing noises. Whereas if less of such a possibility, the diode D1 comes to a floating state, thereby enabling the occurrence of the switching loss as illustrated in FIGS. 5 and 6 to be reduced.

It may therefore be sufficient that the threshold voltage, to which the comparator CMP1 refers, is set to a voltage value less than a value decreased by a maximum amplitude of the ringing noise from the voltage value corresponding to the breakdown voltage of the circuit component to be used.

SECOND WORKING EXAMPLE

Figure 7B:
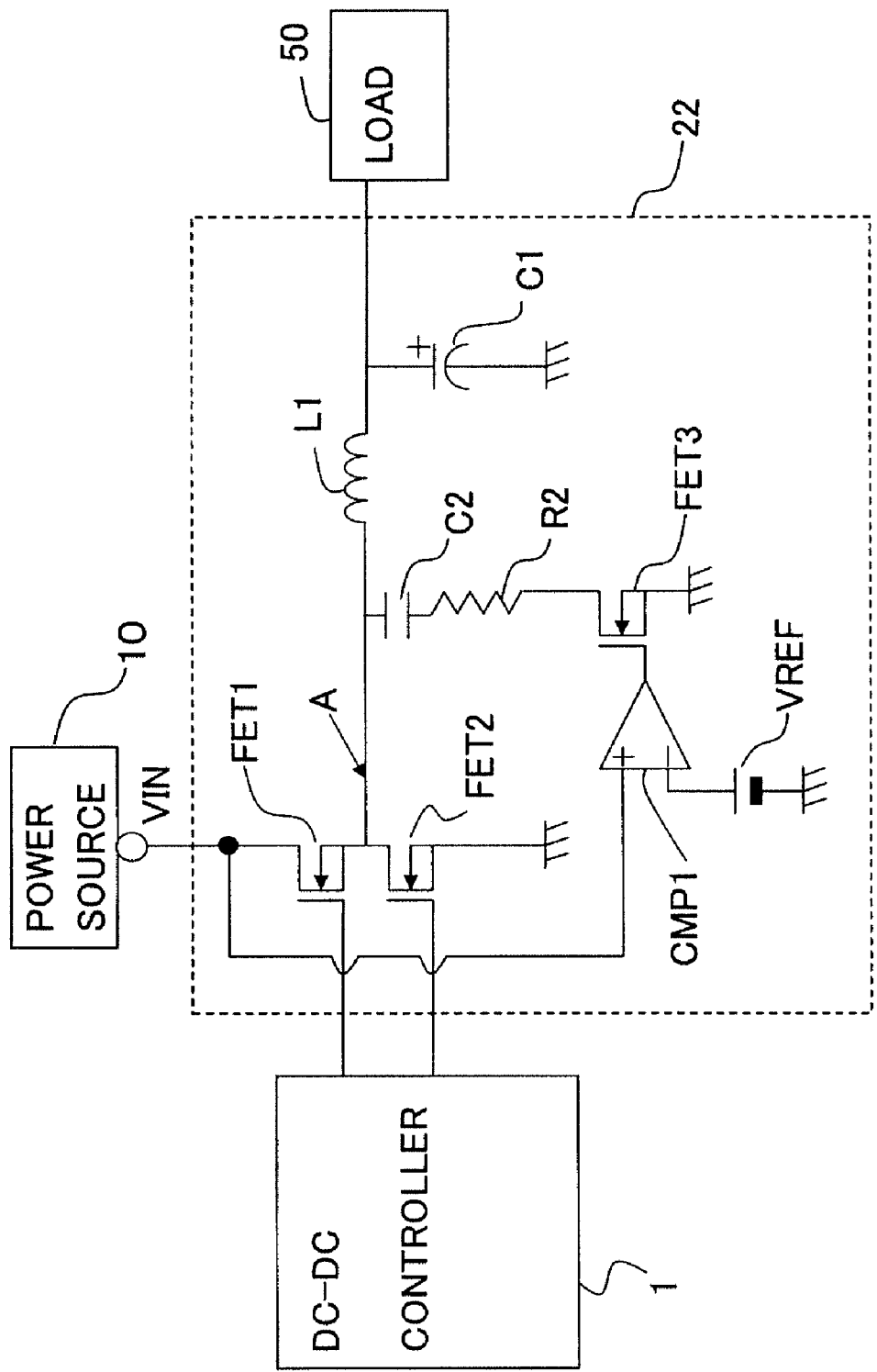
FIG. 7B is a diagram illustrating the voltage adjusting circuit according to a second working example.

FIG. 7B depicts a voltage adjusting circuit 22 according to a second working example. The voltage adjusting circuit 22 includes, in addition to the configuration of the basic control circuit in FIG. 4B, the FET3 defined as the switching element provided between a series CR circuit constructed of a capacitor C2 and a resistance R2 and the ground potential. In FIG. 7B also, similarly to FIG. 7A, the output terminal of the comparator CMP1 is connected to the gate of the FET3. The connection and the operation of the comparator CMP1 are the same as in FIG. 7A, and hence their in-depth descriptions are omitted.

In the second working example, if the input voltage VIN given from the power source 10 exceeds the threshold voltage VREF, the CR circuit is made to function, thereby restraining the ringing noise. Whereas if less of such a possibility, the CR circuit comes to the floating state, thereby enabling the occurrence of the switching loss as illustrated in FIGS. 5 and 6 to be reduced.

THIRD WORKING EXAMPLE

Figure 7C:
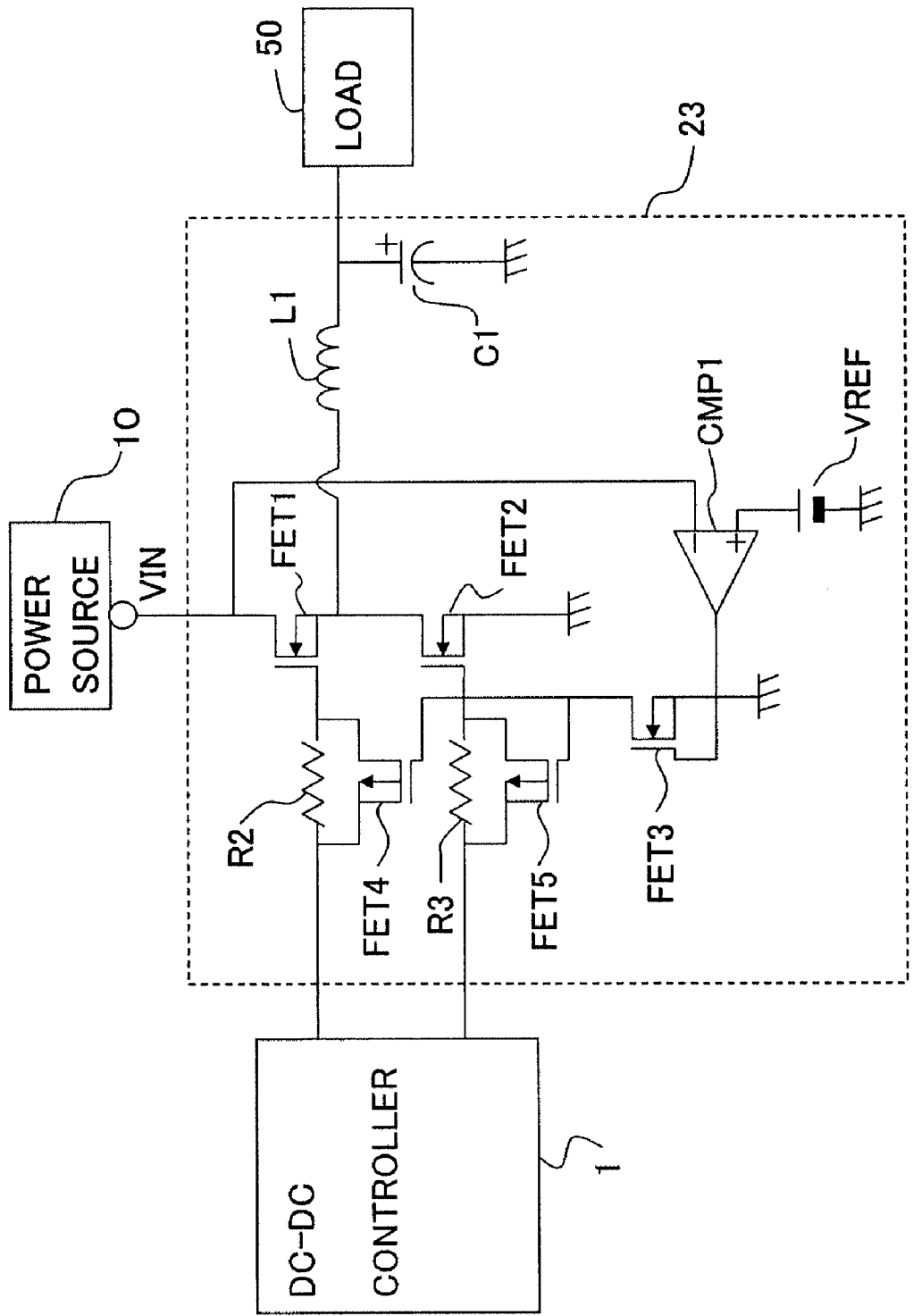
FIG. 7C is a diagram illustrating the voltage adjusting circuit according to a third working example.

FIG. 7C depicts a voltage adjusting circuit 23 according to a third working example. The voltage adjusting circuit 23 includes, in addition to the configuration of the basic control circuit in FIG. 4C, FET4, FET5 defined as the switching elements provided respectively in parallel with the resistances R2, R3 in the gate circuits of the FET1, FET2 serving as the switching elements. Both of the FET4, FET5, which are P-type MOS transistors, are set in the ON-state when the gates are at the low potential (LO). While on the other hand, when the gates are at the high potential (HI) or in the floating state, both of the FET4, FET5 are set in the OFF-state.

In FIG. 7C, further, the respective gates of the FET4, FET5 can be connected to the ground potential via the FET3 defined as the switching element. Moreover, the gate of the FET3 is connected to the comparator CMP1 in order to switch ON or OFF the FET3. The configurations and the operations of the FET3 and the comparator CMP1 are the same as in the case of the first and second working examples, and hence in-depth descriptions thereof are omitted. In FIG. 7C, however, the input voltage VIN given from the power source 10 is connected to a negative-sided input terminal of the comparator CMP1. Further, the threshold voltage VREF is connected to the positive-sided input terminal of the comparator CMP1. The comparator CMP1 and the FET3 correspond to a control circuit.

In the third working example, if the input voltage VIN given from the power source 10 exceeds the threshold voltage VREF, the comparator CMP1 switches OFF the FET3. Hereupon, both of the gates of the FET4, FET5 come to the floating state, and both of the FET4, FET5 are switched OFF. In this case, the voltage adjusting circuit 23 in FIG. 7C functions in the same way as in the case of FIG. 4C.

Whereas if the input voltage VIN given from the power source 10 is lower than the threshold voltage VREF, the comparator CMP1 switches ON the FET3. Hereupon, it follows that both of the gates of the FET4, FET5 are grounded, and both of the FET4, FET5 defined as the P-type MOS transistors are switched ON. Accordingly, it follows that both ends of the resistances R2, R3 are short-circuited by the FET4, FET5. In this case, the control pulse signal given from the DC-DC controller 1 bypasses the resistances R2, R3 and reaches the gates of the FET1 and FET2 via the FET4, FET5. Accordingly, the occurrence of the switching loss as illustrated in FIGS. 5 and 6 is restrained.

FOURTH WORKING EXAMPLE

Figure 7D:
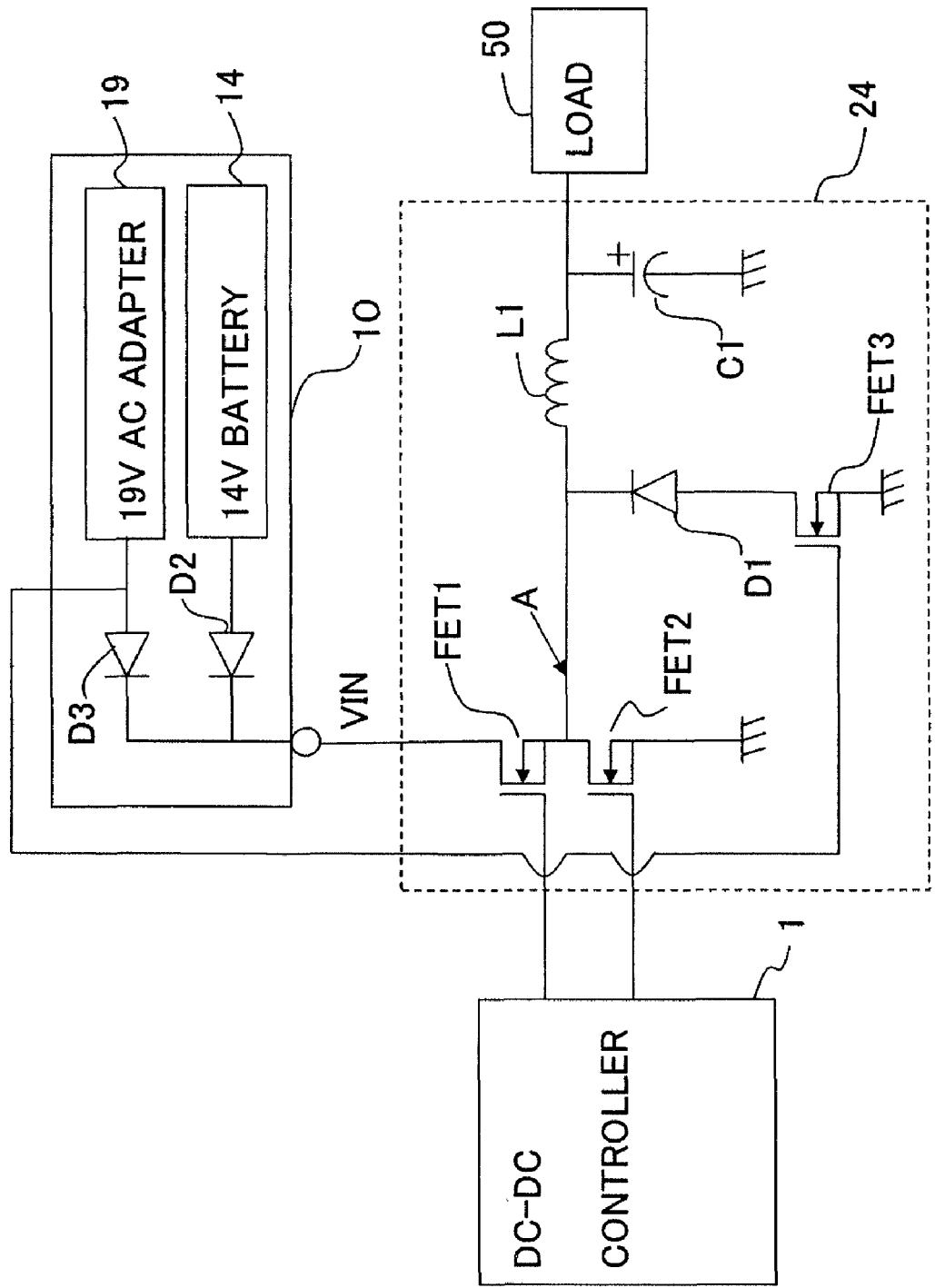
FIG. 7D is a diagram illustrating the voltage adjusting circuit according to a fourth working example.

FIG. 7D depicts a voltage adjusting circuit 24 according to a fourth working example. The voltage adjusting circuit 24 switches ON or OFF the FET3 by use of a signal indicating which power voltage is supplied in a plurality of power voltages from within the power source 10 instead of employing the comparator CMP1 in the first working example. In the example of FIG. 7D, the power source 10 includes a battery 14 capable of supplying an input voltage of 14V and an AC adaptor 19 capable of supplying an input voltage of 19V. Each of these voltage values is one example applied to the fourth working example, which does not mean that the present electronic circuit is limited to these specific voltage values.

The battery 14 and the AC adaptor 19 are connected to the output terminal of the power source 10 via diodes D2, D3, respectively. These diodes D2, D3 are called a matching circuit. The matching circuit includes a plurality of diodes each connected to a power source of a different power voltage, in which case it follows that the highest power voltage is supplied from the cathode side of the diode. In FIG. 7D, however, though omitted, the AC adaptor 19 and the battery 14 are individually capable of controlling the supply and the cut-off of the voltage to and from the matching circuit (the diodes D2, D3). Then, a circuit configuration of FIG. 7D is that the power line supplied from the AC adaptor 19 branches off and is thus supplied to the gate of the FET3. The signal line branching off from the power line supplied from the AC adaptor 19 and the FET3 correspond to a control circuit.

Accordingly, in the case of supplying the voltage of the AC adaptor 19 to the diode D3 of the matching circuit, the FET3 is switched ON, and it follows that the diode D1 is inserted in between the setup potential and the point A. While on the other hand, in the case of not supplying the voltage of the AC adaptor 19 to the diode D3 of the matching circuit, the FET3 is switched OFF, and the diode D1 gets floating. As a result of the configuration discussed above, the voltage adjusting circuit 24 in the fourth working example functions in the same way as the voltage adjusting circuit in the first working example does.

Note that the input voltage value of not the AC adaptor 19 but the battery 14 is a voltage value of such a level as not to be over the breakdown voltage of the element even when the ringing occurs. The voltage 14V of the battery 14 is, in FIG. 7D, set as the voltage that is not over the breakdown voltage of the element even when the ringing described above occurs, however, this value is given by way of one example. Such being the case, to generalize the configuration of FIG. 7D, the following consideration can be made.

Figure 1:
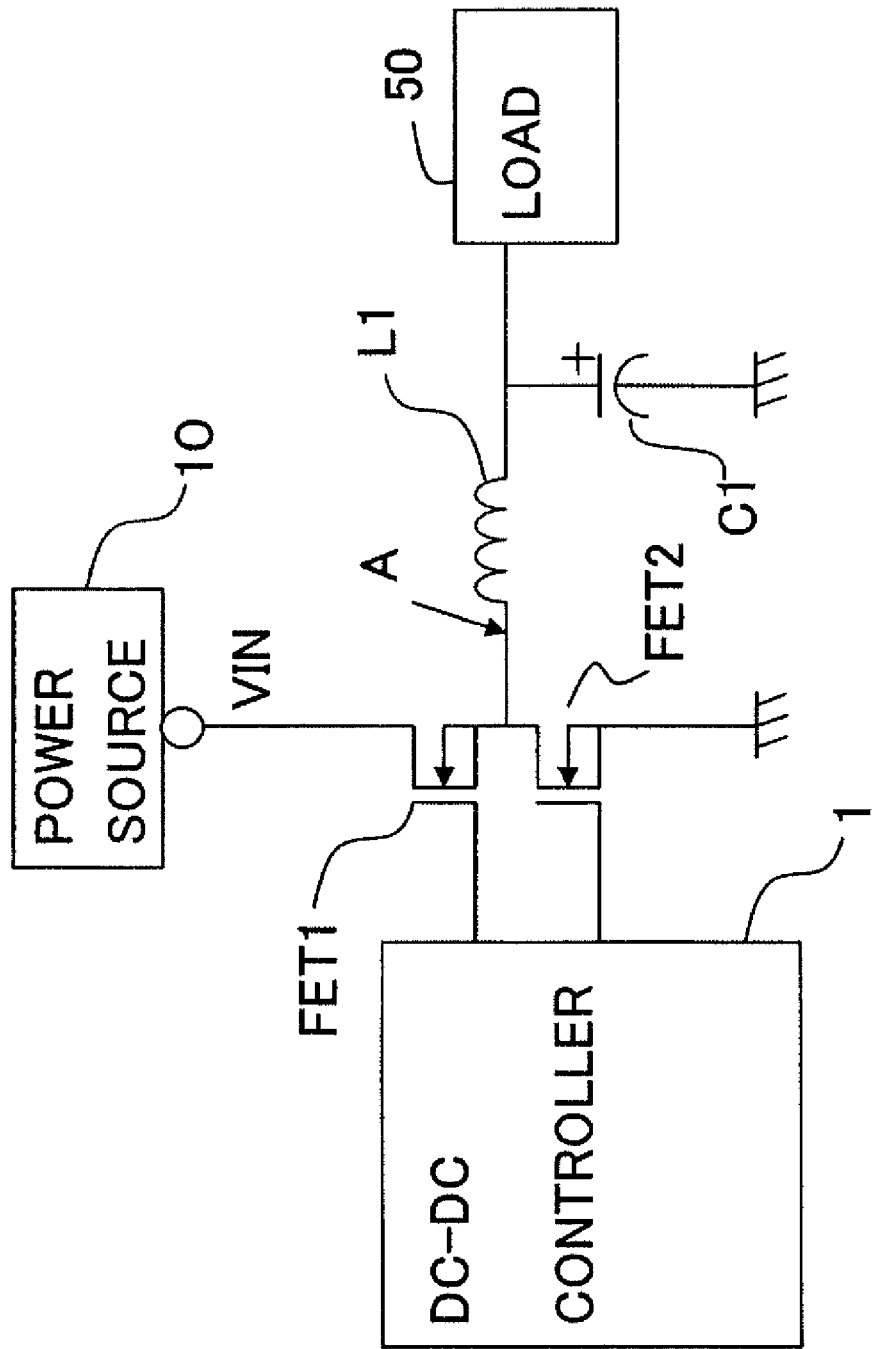
FIG. 1 illustrates an example of a voltage adjusting circuit having none of countermeasure against ringing.
Figure 2:
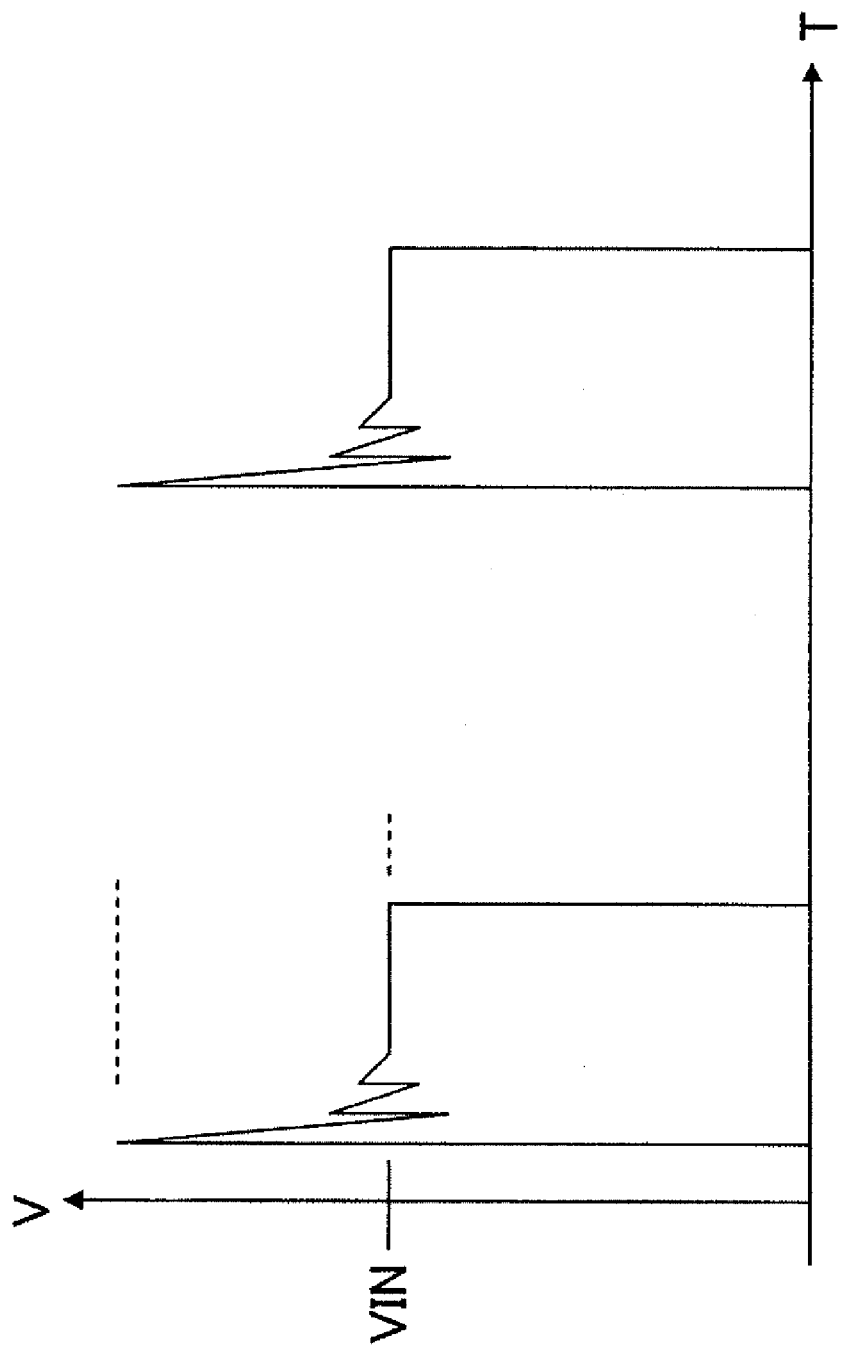
FIG. 2 illustrates an example of a result of observing a voltage.

If an amplitude $\Delta V$ of the ringing noise can be presumed from the characteristics or experimental accumulation data etc of the circuit element, the circuit may be configured depending on a determination as to whether the circuit for restraining the ringing noise is operated or not, which is based on whether or not the input voltage VIN exceeds a value given by VLIM$-\Delta V$ with respect to a breakdown voltage VLIM of the circuit element building up the circuit. Namely, if the input voltage VIN has a relation such as VIN>VLIM$-\Delta V$, a circuit voltage (for example, a voltage VA at the point A in FIG. 1) is given by: VA=VIN+$\Delta V$>VLIM, which implies a possibility of exceeding the breakdown voltage VLIM of the circuit element. Then, a case exists, in which it is known beforehand from the characteristics or the experimental values, the empirical values, etc of the circuit element that there is a high possibility of the condition described above being accomplished, i.e., the input voltage VIN being given by: VIN>VLIM$-\Delta V$.

The voltage adjusting circuit 24 in the fourth working example can be applied to such a case. Namely, this is because the circuit for controlling the operation/non-operation of the ringing noise restraining function may be configured based on the signal indicating the selection result of the power voltage. For example, when the input voltage VIN is supplied from the power source with the voltage being higher than VLIM−ΔV, the configuration may be made so that the FET3 is switched ON. Further, when the input voltage VIN is supplied from the power source with the voltage being lower than VLIM−ΔV, the configuration may be made so that the FET3 is switched OFF.

The fourth working example has exemplified how the FET3 is switched over by modifying the voltage adjusting circuit 21 in the first working example, however, the voltage adjusting circuit 21 in the second and third working examples may also be modified. In the case of the third working example, however, it follows that when the input voltage VIN is supplied from the power source with the voltage being higher than VLIM−ΔV, the configuration is made so as to switch OFF the FET3. Moreover, when the input voltage VIN is supplied from the power source with the voltage being lower than VLIM−ΔV, the configuration may be made so that the FET3 is switched ON.

Further, in FIG. 7D, the voltage is supplied to the FET3 by the direct branch of the power line of the AC adaptor 19. As a substitute for this configuration, however, the FET3 may also be controlled by performing the branch-off of the control signal for the control about whether the voltage of the AC adaptor 19 is supplied to the diode D3 of the matching circuit or not.

FIFTH WORKING EXAMPLE

Figure 7E:
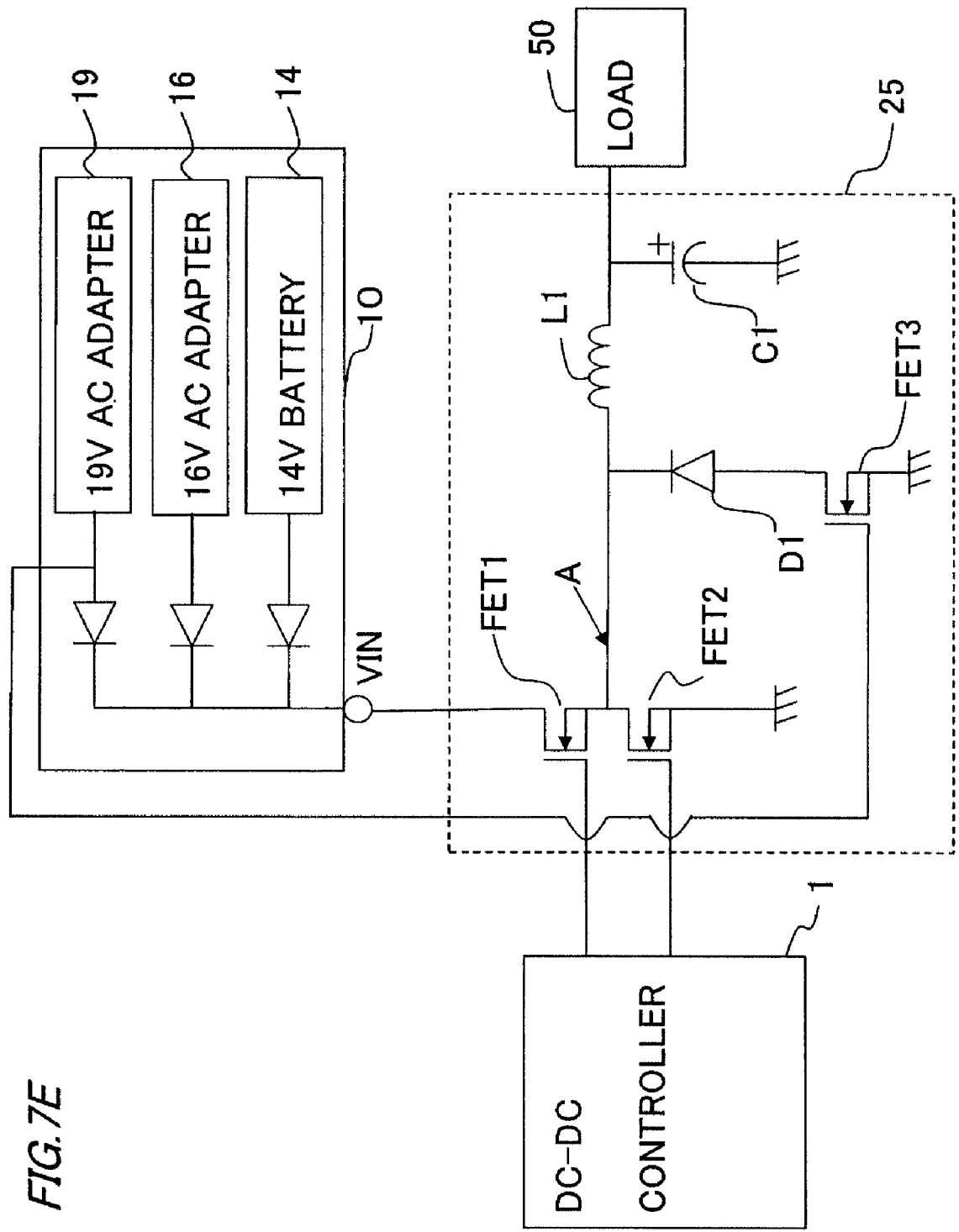
FIG. 7E is a diagram illustrating the voltage adjusting circuit according to a fifth working example.

FIG. 7E illustrates a voltage adjusting circuit 25 according to a fifth working example. The voltage adjusting circuit 25 has substantially the same circuit configuration as the voltage adjusting circuit 24 in the fourth working example has. In the fifth working example, however, the power source 10 includes the 14V-output battery 14, the 16V-output AC adaptor 16 and the 19V-output AC adaptor 19. These voltage values are given by way of one example applied to the fifth working example, which does not mean that the present electronic circuit is limited to these specific voltage values.

In the case of the fifth working example also, the FET3 is switched ON when the AC adaptor 19 supplies the power voltage, and it follows that the diode D1 is inserted in between the setup potential and the point A. Whereas when the AC adaptor 19 does not supply the power voltage, the FET3 is switched OFF, and the diode D1 gets floating. As a result, the voltage adjusting circuit 25 in the fifth working example functions in the same way as the voltage adjusting circuit in the first working example does.

The fifth working example also assumes the case in which the amplitude ΔV of the ringing noise can be estimated. Then, if the value given by VLIM−ΔV is on the order of 16V with respect to the breakdown voltage VLIM of the circuit element building up the circuit, the circuit configuration in FIG. 7E enables the voltage to be controlled so as not to be over the breakdown voltage of the element even when the ringing occurs.

Further, for instance, if the voltage given by VLIM−ΔV is on the order of 15V and if the voltage is supplied from any one of the AC adaptor 16 and the AC adaptor 19, the FET3 is switched ON, whereby the diode D1 needs functioning. In such a case, for example, the signal branching off from the power line of each of the 16V-output AC adaptor 16 and the 19V-output AC adaptor 19 may be connected to the gate of the FET3 via an OR gate.

Note that as discussed in the fourth working example, the control signal may branch off in place of using the signal branching off from the power line of each of the AC adaptor 16 and the AC adaptor 19. To be specific, if there is the control signal for switching ON or OFF each of the AC adaptor 16 and the AC adaptor 19, the FET3 may be switched ON or OFF by employing this type of control signal.

Thus, the case in which the ringing prevention circuit should be made to function by switching ON the FET3 (whether or not the ringing prevention circuit should be made to function by detecting which power source the voltage is supplied from), is set from a relation between the breakdown voltage of the circuit component and the amplitude of the ringing noise. Accordingly, there can be a plurality of power sources as target sources that should make the ringing prevention circuit function. In this case, an available scheme is that these are joined via OR logic, thereby controlling the FET3.

SIXTH WORKING EXAMPLE

Figure 8:
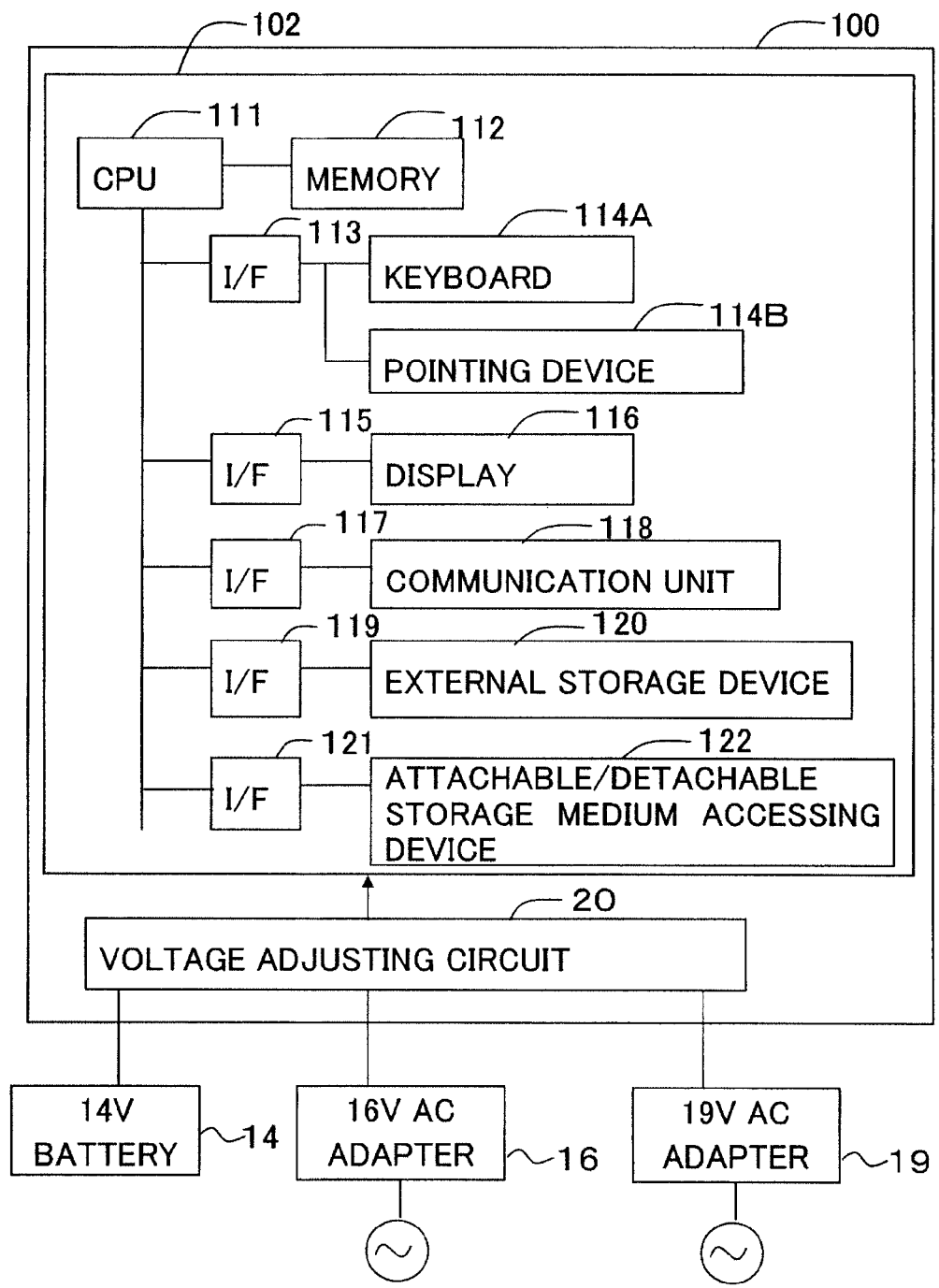
FIG. 8 is a diagram illustrating a configuration of an electronic device according to a sixth working example.

A sixth working example will be discussed with reference to FIGS. 8 and 9. FIG. 8 is a diagram illustrating a configuration of an electronic device 100 according to the sixth working example. The electronic device 100 is exemplified by a personal computer, a Personal Digital Assistant, a mobile TV receiver, a mobile navigation device, mobile reproducing devices for moving pictures, music, etc. As in FIG. 8, the electronic device 100 includes a processing unit 102 (corresponding to a body unit) and a voltage adjusting circuit 20. The processing unit 102 includes: a CPU 111; a memory 112; a keyboard 114A and a pointing device 114B that are connected to the CPU 111 via an interface 113; a display 116 connected to the CPU 111 via an interface 115; a communication unit 118 connected to the CPU 111 via an interface 117; an external storage device 120 connected to the CPU 111 via an interface 119; an attachable/detachable storage medium accessing device 122 connected to the CPU 111 via an interface 121, and so on.

The pointing device 114B is exemplified by a mouse, a track ball, a flat point, etc. The communication unit 118 is exemplified such as a LAN (Local Area Network) board, an infrared-ray communication unit, a wireless LAN, a Bluetooth unit, a broadcast wave receiving circuit, etc. The external storage device 120 is exemplified such as a hard disk, a flash memory device, etc. The attachable/detachable storage medium accessing device 122 is exemplified by a drive for a CD (Compact Disc) and a DVD (Digital Versatile Disk), etc and an input/output device for a flash memory card, etc.

The electronic device 100 illustrated in FIG. 8 is mounted with the following voltage adjusting circuit 20 (the DC-DC converter circuit with the ringing prevention circuit) by way of one example. Note that the following voltage values are given by way of one example applied to the sixth working example, which does not mean that the present electronic circuit is limited to these specific voltage values.

Load: CPU: 1V Voltage Adjusting Circuit×3 circuits;
Memory: 1.5V Voltage Adjusting Circuit×1 circuit;
Bus, CPU: 1.05V Voltage Adjusting Circuit×1 circuit;
I/O: 5V Voltage Adjusting Circuit×1 circuit;
I/O: 3.3V Voltage Adjusting Circuit×1 circuit;
Charging Circuit: 12-14V Voltage Adjusting Circuit×1 circuit.

Figure 9:
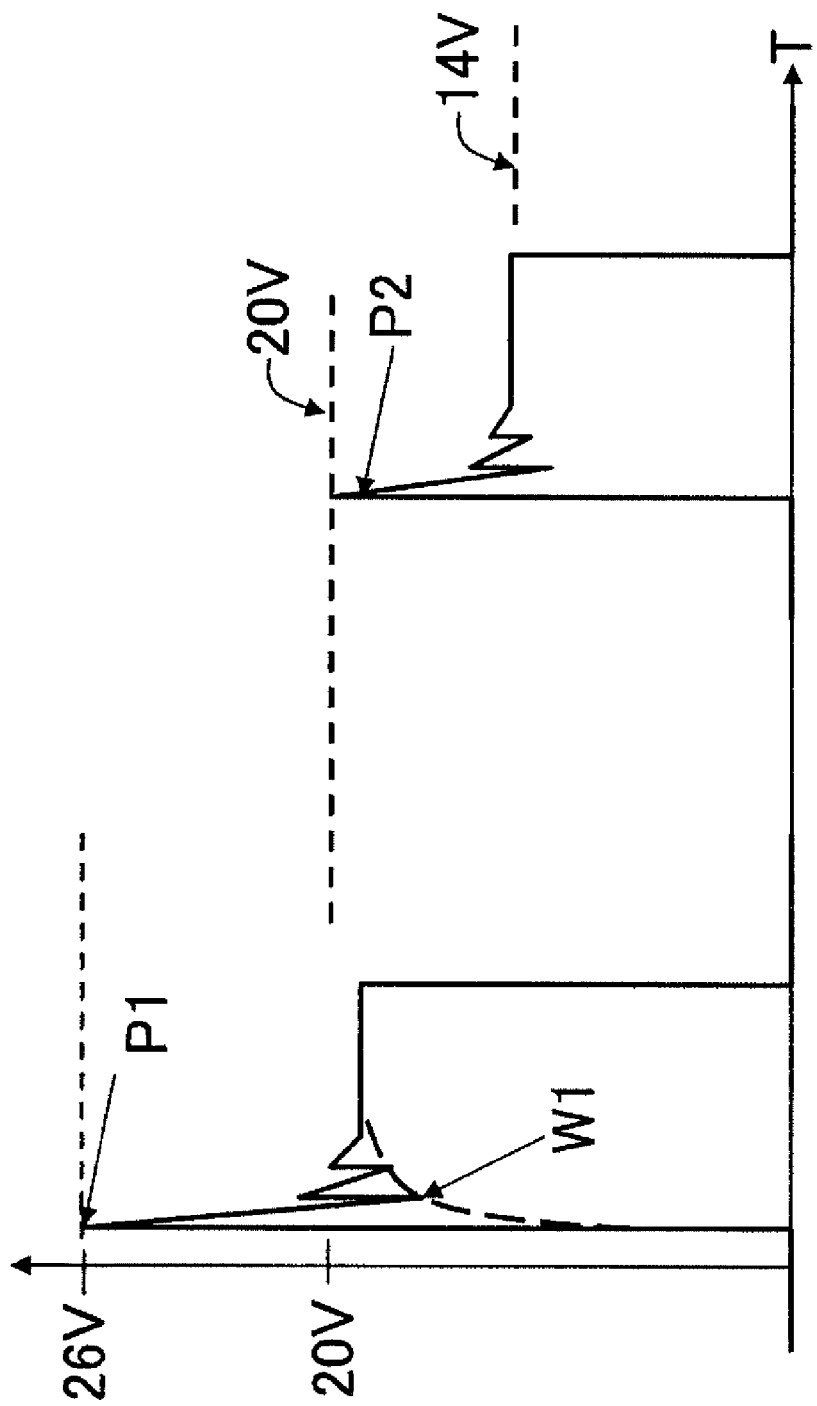
FIG. 9 is a diagram illustrating an operation of a voltage adjusting circuit according to the sixth working example.

FIG. 9 illustrates an operation of the voltage adjusting circuit 20 of the electronic device 100 in FIG. 8. For example, when inputting the voltage to the AC adaptor (when inputting a voltage of 20V), a maximum voltage value of the input voltage due to the ringing reaches about 26V, and hence the circuit component to be used generally entails employing a circuit component of which the breakdown voltage is on the order of 30V.

On the other hand, an assumption is that the circuit component having the breakdown voltage of 20V is used as the circuit component of the voltage adjusting circuit 20. Further, in the voltage adjusting circuit 20, similarly to the first through third working examples, the flywheel diode, the CR circuit and the resistance of the gate terminal, etc that restrain the ringing noise (which are termed a ringing restraining circuit) are connected via the comparator CMP1 on the basis of the threshold voltage VREF. Now, it is known from the circuit configuration and the accumulated experimental data that the maximum amplitude of the ringing noise is, it is assumed, on the order of 6V.

In this case, the threshold voltage VREF is set less than a voltage value 14V decreased by the maximum amplitude of 6V due to the ringing from the breakdown voltage of 20V of the circuit component to be used. With this contrivance, in the configuration of FIG. 8, the voltage adjusting circuit 20 does not cause any problem about the breakdown voltage of the circuit component because of being within the breakdown voltage of 20V even by the ringing when the voltage is inputted to the battery (when the input voltage is equal to or smaller than 14V).

Note that as a substitute for the determination based on the comparator CMP1, the ringing restraining circuit may also be operated based on the signal indicating the selection result of the power voltage. To be specific, in the case of supplying the input voltage from the 16V-output AC adaptor 16 or 19V-output AC adaptor 19, the same configuration as in the fourth and fifth working examples may be taken, which operates the ringing restraining circuit.

The configuration described above, it is considered, enables the noise peak to be decreased and yields an effect in reducing the influence on other electronic devices. Namely, it might be feasible to reduce a possibility of causing the malfunctions of other electronic circuits. For instance, when the noise peak decreases down to 20V from 26V, the noises propagated to between the circuit components are reduced.

The way of how the waveforms become obtuse is slightly different in the first through third working examples. It is therefore possible to make the adjustment between the efficiency and the noise peak value by properly selecting these circuits. It should be noted that the first through third working examples have discussed the three types of ringing prevention circuits by way of the examples, however, as a matter of course, the configuration of the present voltage adjusting circuit can be applied by the same circuit technique to other ringing prevention circuits of the switching waveforms.

<Effects>

In each of the first through third working examples, the ringing prevention circuit is operated if the input voltage, when detecting the input voltage value, becomes higher than the threshold voltage VREF of the comparator CMP1. This configuration enables the ringing to be restrained and the control to be done so as not to exceed the breakdown voltage of each element. Then, if the input voltage is low, though the ringing occurs to such an extent as not to exceed the breakdown voltage of each element, the switching operation can be performed in a way that decreases the switching loss, and the highly-efficient switching circuit can be configured.

Moreover, the voltage from the battery and the higher voltage from the AC adaptor are inputted to a notebook personal computer etc, and hence the voltage input can be switched over depending on the type thereof, and the configurations in the fourth and fifth working examples exhibit the same effects as those in the first through third working examples. In the fourth working example, the comparator gets unnecessary by inputting a trigger signal for the connection of the AC adaptor 19 directly to the FET3. Similarly, in the fifth working example also, the necessity for the comparator is eliminated by inputting an AC adaptor connection signal having a higher output than a predetermined voltage directly to the FET3.

The configuration in the fifth working example is, however, based on the premise that there are the plural AC adaptors and therefore requires the circuit such as the diode matching circuit.

Further, it is considered that the configurations in the first through fifth working examples have an effect in reducing the influence by decreasing the noise peak having the possibility of causing the malfunctions in other electronic circuits.

The configurations described above decrease the ringing noises and facilitate the layout of the circuit components. Moreover, the circuit component exhibiting the low breakdown voltage can be used by decreasing the ringing noises. A cost for the circuit components can be reduced, for example, down to approximately ⅔ as low as the hitherto-expended cost. Moreover, the space for the circuit components can be decreased, for example, down to about ⅔ as small as the hitherto-provided space.

According to the embodiment, it is feasible to restrain the inconvenience that the voltage within the circuit has the higher value than normal due to the superposition of the fluctuation component over the circuit including the switching element.

According to the embodiment, it is feasible to stably operate the circuit including the switching element even without selecting a component of which the element breakdown voltage is higher than required.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A DC-DC converter to convert an input voltage into a target output voltage, comprising:
   a switching element to generate a pulse waveform by repeatedly admitting and cutting off the input voltage;
   a fluctuation component restraining circuit to restrain a fluctuation component generated in superposition on the pulse waveform and having a shorter cycle than a cycle of the pulse waveform; and
   a control circuit to operate the fluctuation component restraining circuit when the input voltage is equal to or larger than a reference voltage.

2. The DC-DC converter according to claim 1, wherein the reference voltage takes a value smaller than a voltage value decreased by a maximum amplitude of the fluctuation component from an allowable voltage value of a circuit element to be used.

3. The DC-DC converter according to claim 1, wherein the control circuit sets the fluctuation component restraining circuit in an operation state when the input voltage is input from an AC adaptor and sets the fluctuation component restraining circuit in a non-operation state when input from a battery.

4. The DC-DC converter according to claim 1, wherein the control circuit sets the fluctuation component restraining circuit in the operation state or the non-operation state depending on a type of the AC adaptor when plural types of different voltages are input from plural types of AC adaptors.

5. The DC-DC converter according to claim 1, wherein the fluctuation component restraining circuit includes, between a path extending from an output terminal of the switching element toward a load of the DC-DC converter and a ground potential, a diode connected so that a cathode is provided on the side of the path and an anode is provided on the side of the ground potential, and a switch circuit connected in series to the diode, and the control circuit operates, when the input voltage is equal to or larger than the reference voltage, the diode by setting the switch circuit in a connection state.

6. The DC-DC converter according to claim 1, wherein the fluctuation component restraining circuit includes, between a path extending from an output terminal of the switching element toward a load of the DC-DC converter and a ground potential, a CR series circuit having a capacitance and a resistance, and a switch circuit connected in series to the CR series circuit, and the control circuit operates, when the input voltage is equal to or larger than the reference voltage, the CR series circuit by setting the switch circuit in a connection state.

7. The DC-DC converter according to claim 1, wherein the fluctuation component restraining circuit includes an input resistance of a control terminal of the switching element and a switch circuit to bypass the input resistance, and the control circuit restrains, when the input voltage is equal to or larger than the reference voltage, the fluctuation component by cutting off the switch circuit.

8. A control method of a DC-DC converter comprising: a switching element to generate a pulse waveform by repeatedly admitting and cutting off an input voltage; and a fluctuation component restraining circuit to restrain a fluctuation component generated in superposition on the pulse waveform and having a shorter cycle than a cycle of the pulse waveform, the method comprising:

operating the fluctuation component restraining circuit when the input voltage is equal to or larger than a reference voltage; and inputting the input voltage to the switching element.

9. An electronic device comprising:

a DC-DC converter to convert an input voltage into a target output voltage; and a body unit to receive a supply of the output voltage from the DC-DC converter, the DC-DC converter including:
  a switching element to generate a pulse waveform by repeatedly admitting and cutting off the input voltage;
  a fluctuation component restraining circuit to restrain a fluctuation component generated in superposition on the pulse waveform and having a shorter cycle than a cycle of the pulse waveform; and
  a control circuit to operate the fluctuation component restraining circuit when the input voltage is equal to or larger than a reference voltage.

* * * * *